April 3, 1962 R. PLUHÁČEK ET AL 3,027,599
METHOD OF MOLDING ARTICLES FROM SCRAP TIRE MATERIAL
Filed June 13, 1957
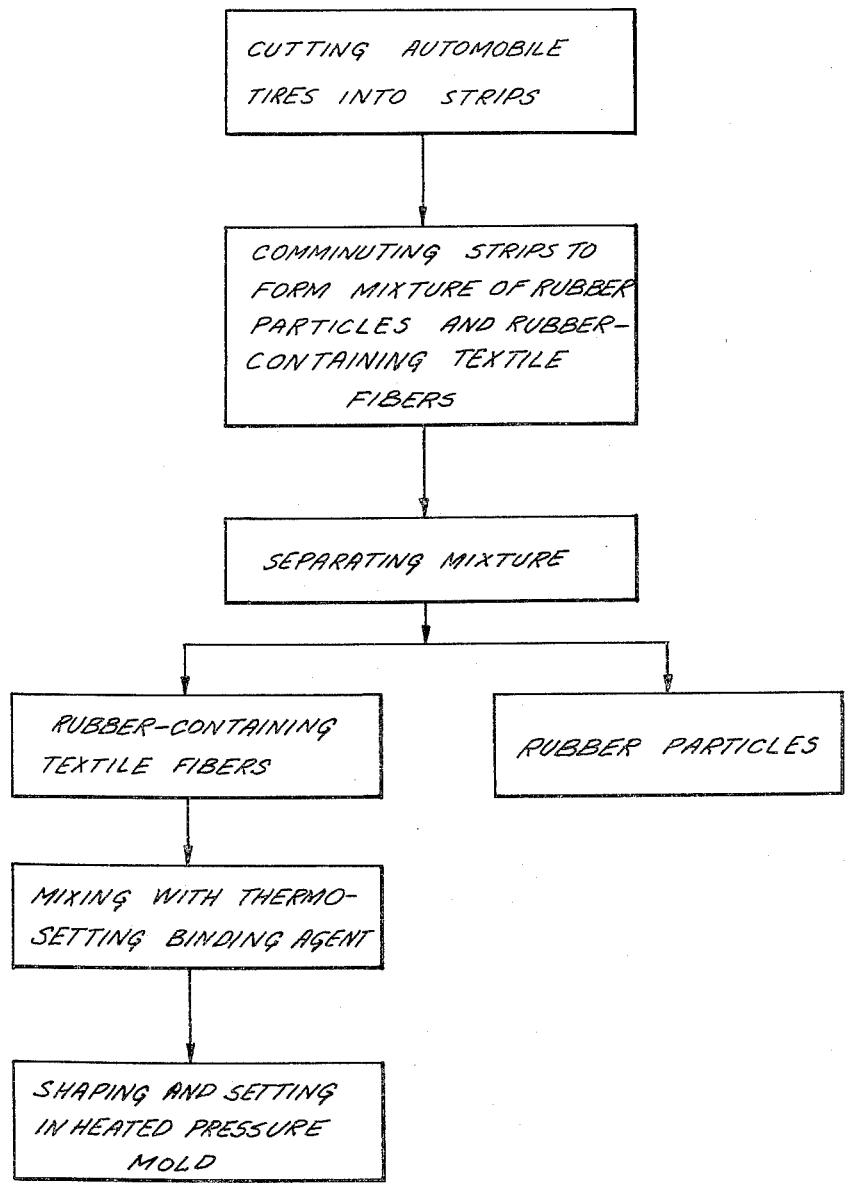
INVENTORS
Rudolf Pluháček
and Josef Trachta
BY
Michael S. Striker
Attorney

United States Patent Office 3,027,599
Patented Apr. 3, 1962

3,027,599
METHOD OF MOLDING ARTICLES FROM
SCRAP TIRE MATERIAL
Rudolf Pluháček, 780 Kistkova, Gottwaldov, Czechoslovakia, and Josef Trachta, 5 Chalov, Prague, Czechoslovakia; Trantiska Pluhackova, Marie Nickova, and Rudolf Pluháček, Jr., heirs of Rudolf Pluháček, deceased
Filed June 13, 1957, Ser. No. 665,603
Claims priority, application Czechoslovakia June 15, 1956
2 Claims. (Cl. 18—55)

The present invention relates to a method of producing shaped bodies and to the manufacture of various articles from a new type of raw material.

Efforts have already been made to replace wood by new materials from easily obtainable initial substances, but the new materials have not proved successful. Their machining has met with difficulties, they have not been resistant against heat or moisture, apart from their initial cost being high. This is why their use in industry has been discontinued.

The raw material according to the present invention is free from the above drawbacks. The basic substance for the new raw material is textile waste, which is obtained by grinding old rubber tires, or waste materials obtained in the manufacture of rubber footwear and in the production of rubberised textile material [vulcanised or non-vulcanised]. The chosen type of the textile waste or a mixture of various types of waste, either torn, ground or in the original state, containing minute particles of rubber waste is soaked with a liquid binding agent or mixed with a solid binding agent, e.g. formaldehyde [phenol formaldehyde resin], turbid phenol, light phenol, soda lye, water glass, regenerator dispersion, latex etc. swelling agents may be added to the textile waste or to a mixture of various types of textile waste, said swelling agents producing enclosed air spaces in the material.

From the above disclosed suitably prepared material plates or bodies are pressed in a mould under a pressure of 250 to 300 atm. and at a temperature of 150° C., said plates or bodies having suitable dimensions, the required profile, suitable thickness, elasticity and hardness.

The type of the textile waste used exerts an influence upon the properties of the plates or bodies and thereby upon the quality of the products. This means that the type of the textile waste or the proportion of the individual types of waste in the mixture have to be chosen according to the purpose of use of the product.

In rubber-works, rubberising plants and the manufacture of rubber footwear, hoses etc. considerable quantities of the above mentioned waste are accumulated. Such waste has hitherto been destroyed, e.g. burnt, and its considerable up-to-now unknown value lost thereby.

The treatment of the waste by the method according to the present invention so as to produce plates or bodies of various profiles, various thickness, hardness and elasticity results in a saving of wood, which is in short supply. The obtained plates or bodies represent a new basic raw material for the manufacture of packing cases, panels, insulating floor tiles, window frames etc. Further they may be used as material for weekend-houses and various other building purposes.

The surface of the plates may be adapted according to requirements and purpose. For example hards of flax- or hemp [flock] or any other suitable material may be admixed to the mass already during its production. Alternatively, the surface treatment may be carried out by spraying a coat of colour, synthetic material or by adhering various other known products, such as linoleum, ply-wood, veneer, parquets etc. on the surface of said plates.

The manufacture of the plates or bodies is very simple and cheap considering that the cheapest kind of waste and cheap binding agents, which are in ample supply, are used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the FIGURE is a flow sheet illustrating the process of the present invention.

Referring now to the drawing, the manufacturing process is carried out in the following manner:

The chosen kind of textile waste or a mixture of several kinds of waste, is either torn, ground or left in its original state. The mixture thus produced is soaked with a suitable binding agent or mixed with a solid binding agent. A suitable swelling agent may be added to the textile waste. The obtained mass is pressed in a mould under a pressure of 250 to 300 atm. and at a temperature of 150° C. into plates or bodies, which are surface treated in a suitable way.

Alternatively, cord threads may be used as basic material, said cord threads having been obtained in the production of rubber regenerate from old worn rubber tires by grinding and tearing the same, whereupon the rubber pulp is sieved and the threads sucked away. The cord threads are soaked or mixed with a hardenable pressing material as binding agent and pressed into their final shape either intermittently or continuously.

When separating the cord threads from the rubber mass of the tire, various lengths of threads, preferably 20 to 50 mm., may be obtained by a suitable control of the rough and fine grinding process.

The cord threads, after having been soaked in a hardenable liquid, are dried and introduced into a mould in which they are pressed under a pressure of 250 to 300 atm. and a temperature of about 150° C. to the desired products. The basic material prepared from the cord threads or cord waste may be covered in the mould at one or both sides with a layer of a suitable material such as ground bark, leached tanning bark etc. or flax waste hards of flax or hemp [flock] or another organic substance. Alternatively, the basic material may be provided in the mould at one or both sides with vulcanised or non-vulcanised pieces of fabric.

The process may also be carried out in such a manner that a layer of pieces of vulcanised or non-vulcanised fabric is provided in the mould at one or both sides with layers of the basic material prepared from the cord threads.

The surface treatment of the thus obtained articles may be carried out in any desired way, as mentioned above, e.g. by applying a layer of veneer or of a suitable substance, by spraying, or the article may obtain a surface finish by sand blasting, treating with kaolin etc.

We claim:

1. A method of producing shaped bodies such as sheets, plates, and the like, comprising the steps of cutting up into thin strips a material consisting essentially of textile fibers and rubber such as used automobile tires and the like; further comminuting said strips so as to obtain a mixture of textile fibers at least the major portion of which has a length of the order of between about 20 and 50 mm. and having a portion of said rubber bound thereto, and of free, relatively small, rubber particles; separating at least the major portion of said free rubber particles from said textile fibers having rubber bound thereto; intimately mixing the thus separated fibrous material with a thermosetting binding agent adapted to be activated at an elevated temperature of the magnitude of 150° C. so as to bind said fibrous rubber containing material together and to form a solid mass with the same shaping the thus-formed mixture; under pressure and heating to said elevated temperature, thereby activating said binding agent and also the adhesive properties of the rubber constituent of said mass, whereby a shaped body the mechanical strength of which is increased due to the fibers and the coherence of which increased by said rubber therein, is obtained.

2. A method of producing shaped bodies according to claim 1 wherein the shaping of the formed mixture is effected in a mold in which the shaped mixture is covered at least partially with a textile sheet and molded.

References Cited in the file of this patent

UNITED STATES PATENTS

| | | |
|---|---|---|
| 1,629,487 | Draullette | May 24, 1927 |
| 2,126,672 | Smith et al. | Aug. 9, 1938 |
| 2,273,313 | Clapp | Feb. 17, 1942 |
| 2,433,727 | Arnold | Dec. 30, 1944 |
| 2,456,093 | Swedlow | Dec. 14, 1948 |
| 2,794,057 | Gunther | May 28, 1957 |